United States Patent
Chen et al.

(10) Patent No.: US 7,026,630 B2
(45) Date of Patent: Apr. 11, 2006

(54) ULTRAVIOLET STERILIZATION DEVICE WITH AUTOCLEANING STRUCTURE

(75) Inventors: Jian Chen, Fujian (CN); Xiang Yang Yao, Fujian (CN)

(73) Assignee: Fujian Newland Entech Co., Ltd., Fujian (CN)

( * ) Notice: Subject to any disclaimer, the term of this patent is extended or adjusted under 35 U.S.C. 154(b) by 0 days.

(21) Appl. No.: 10/941,359

(22) Filed: Sep. 15, 2004

(65) Prior Publication Data

US 2005/0061998 A1    Mar. 24, 2005

(30) Foreign Application Priority Data

Sep. 19, 2003    (CN) ............................... 03280592 U

(51) Int. Cl.
*G01N 23/12*    (2006.01)
(52) U.S. Cl. .................... 250/431; 250/435; 250/461.1
(58) Field of Classification Search ................ 250/431, 250/435, 461.1, 504 R; 422/186
See application file for complete search history.

(56) References Cited

U.S. PATENT DOCUMENTS

| 6,013,917 | A * | 1/2000 | Ishiyama ..................... 250/431 |
| 6,303,087 | B1 * | 10/2001 | Wedekamp .............. 422/186.3 |
| 6,659,431 | B1 * | 12/2003 | Fang et al. ................. 250/431 |
| 6,863,078 | B1 * | 3/2005 | Dall'Armi et al. ........ 134/64 R |

FOREIGN PATENT DOCUMENTS

WO    WO 01/12560 A1    2/2001

* cited by examiner

*Primary Examiner*—John R. Lee
*Assistant Examiner*—Anthony Quash
(74) *Attorney, Agent, or Firm*—Senniger Powers

(57) ABSTRACT

A UV sterilization system with autocleaning structure comprises scrubbing collars, at least one cleaning liquid box and at least one sliding bar. Said cleaning means further comprises at least one towing bar, at least one sliding bar and at least one supporting bar. The boxes are vertically mounted on or fixed to the supporting bar(s) to form together with the supporting bar(s) a rectangular shape. A cleaning liquid addition port and a cleaning liquid drain port are respectively provided at the top and close to the bottom of each cleaning liquid box. Said cleaning liquid addition port is connected with a cleaning liquid supply pipe and the cleaning liquid drain port is closed by a detachable sealing member. Several sets of holes with the same diameter for scrubbing collars are provided on the opposite sides of each box with each set at the same height. Each UV lamp is separately installed within a protective sleeve passing through the scrubbing collars. Each towing bar is fixed to the outside of the cleaning liquid box and is connected with the sliding bar and the piston rod of the driving device. The present device according to the invention can be used for the sterilization of fluid such as sewage, tap water, etc.

6 Claims, 2 Drawing Sheets

ULTRAVIOLET STERILIZATION DEVICE WITH AUTOCLEANING STRUCTURE

TECHNICAL FIELD

The present invention relates to an ultraviolet (UV) sterilization device with autocleaning structure.

BACKGROUND ART

Generally, the current used UV sterilization system is provided with autocleaning structure to clean the surface of UV lamp protective sleeve. The conventional way of cleaning comprises mechanical cleaning and mechanical plus chemical medicament cleaning. In mechanical cleaning, the dirt is removed by driving wiping means along the surface of the lamp protective sleeve back and forth, thus mechanical cleaning can be realized with a simple structure and does not need addition of chemical medicament. However, a lot of heat will be generated during the lighting of the UV lamp and thus solid dirt tends to be formed on the surface of the protective sleeve while performing fluid sterilization. It is difficult for the mechanical cleaning structure to remove the solid dirt and there is a need to add some chemical medicament.

The mechanical plus chemical medicament cleaning structure in the prior art, e.g. disclosed in Chinese patent application 00811520.6, comprises a cleaning sleeve slidably engaging the outside of the UV lamp protective sleeve, and a cleaning room within the cleaning sleeve which is contacted with part of the outside of the UV lamp protective sleeve and filled with cleaning liquid, said cleaning room comprises an opening leading to the outside of the cleaning sleeve, and a pressure balance member is provided in the opening for the sealing between the opening and the outside of the cleaning sleeve. The pressure balance member is movable with the change of pressure gradient therein and move a driving device for the cleaning sleeve along the outside of the UV lamp protective sleeve. The cleaning system of this kind can efficiently clean the surface of the lamp protective sleeve by adding chemical medicament, but it is difficult to manufacture for its complicated structure, and meanwhile each cleaning room is independently connected with an addition means for cleaning liquid, which as well renders the system complicated. Therefore, it is desirable to develop a simple cleaning structure for the lamp protective sleeve of the UV sterilization system in which chemical medicament can be added for efficient cleaning, such that the cost is reduced.

SUMMARY OF THE INVENTION

The object of the present invention is to provide a live sterilization device with autocleaning structure, which has a simple structure and is easy to be assembled, and further, the surface of the lamp protective sleeve can be efficiently cleaned during the sterilization.

The UV sterilization device with autocleaning structure according to the present invention comprises a UV lamp assembly, at least one cleaning structure and at least one driving device for the cleaning structure, wherein each cleaning structure comprises scrubbing collars, at least one cleaning liquid box, at least one towing bar, at least one sliding bar and at least one supporting bar. Each cleaning liquid box as a whole is a pipe with its two ends sealed, and a cleaning liquid addition port and a cleaning liquid drain port are respectively provided at the top and close to the bottom of the pipe. Said cleaning liquid addition port is connected with a cleaning liquid supply pipe and said cleaning liquid drain port is sealed by a detachable sealing member, which can be opened for example by screwing off to discharge the cleaning liquid if desired. Said at least one cleaning liquid box is vertically mounted on or fixed to the supporting bar(s), and several sets of holes for scrubbing collars are provided on the opposite sides of each box with each set at the same height, and each UV lamp is separately installed within a protective sleeve passing through the scrubbing collars. One end of the towing bar is connected with and fixed to the outside of the cleaning liquid box, and the other end thereof is slidably connected with the sliding bar and fixed to the piston rod of the driving device so as to drive the cleaning structure. The cleaning structure is driven through towing bar by driving device to reciprocate along the protective sleeve, thus the scrubbing collars of the cleaning structure are moved to wipe the surface of the lamp protective sleeve back and forth to carry out cleaning. Said driving device may be a pneumatic or hydraulic one.

Preferably, sealing means are arranged between said scrubbing collars and the corresponding holes.

To ensure the sealing effect, each scrubbing collar is tightly pressed and sealed by an outside seal-assisting structure.

The UV sterilization device with autocleaning structure according to the present invention has the following advantages:

1. Online cleaning during sterilization can be realized, i.e., the surface of the lamp protective sleeve can be cleaned when the UV sterilization system is in service without influencing the effect.
2. The surface of the lamp protective sleeve can be efficiently cleaned both mechanically and chemically.
3. The structure and assembling can be simplified by charging the liquid for cleaning all the lamp protective sleeves in one cleaning liquid box.
4. An exact mechanical movement can be performed through the mechanical structure consisting of piston rod, sliding bar and towing bar, so as to ensure the cleaning effect.

In the figures, 1 is lamp assembly of the UV sterilization system; 2 is cleaning structure of the UV sterilization system; 3 is driving device of the cleaning structure, wherein 301 is piston rod, 302 is piston barrel, 303 is air supply pipe, 304 is sliding bar, 305 is air compressor; 4 is sliding ring; 5 is towing bar; 6 is supporting bar of the cleaning structure; 7 is cleaning liquid box; 8 is cleaning liquid addition port; 9 is cleaning liquid drain port; 10 is scrubbing collar; 11 is sealing member of the drain port; 12 is fixing means; 13 is hole for scrubbing collar; 14 is connection means; 15 is seal-assisting structure of the scrubbing collar; 1501 is press cap; 1502 is hole for protective sleeve; 1503 is eyelet; 1504 is screw bolt, 1505 is supporting member for the press cap and 1506 is screw nut.

PREFERRED EMBODIMENTS

Figure 1:
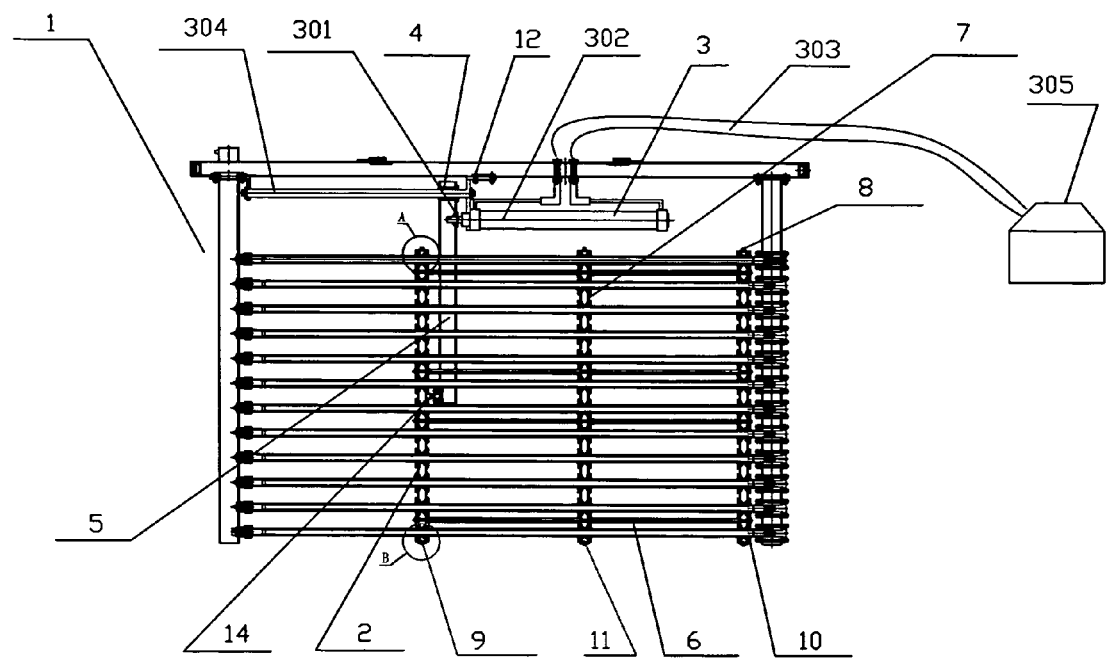
FIG. 1 shows an embodiment of the present invention.
Figure 2:
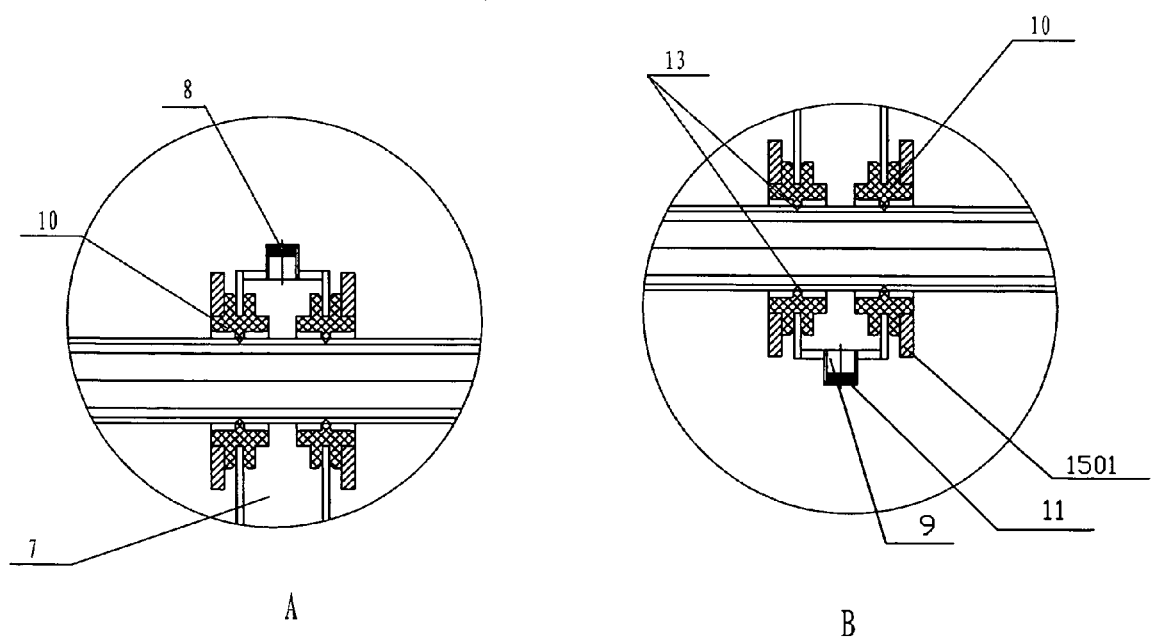
FIG. 2 is enlarged views of portion A and portion B in FIG. 1 respectively.
Figure 3:
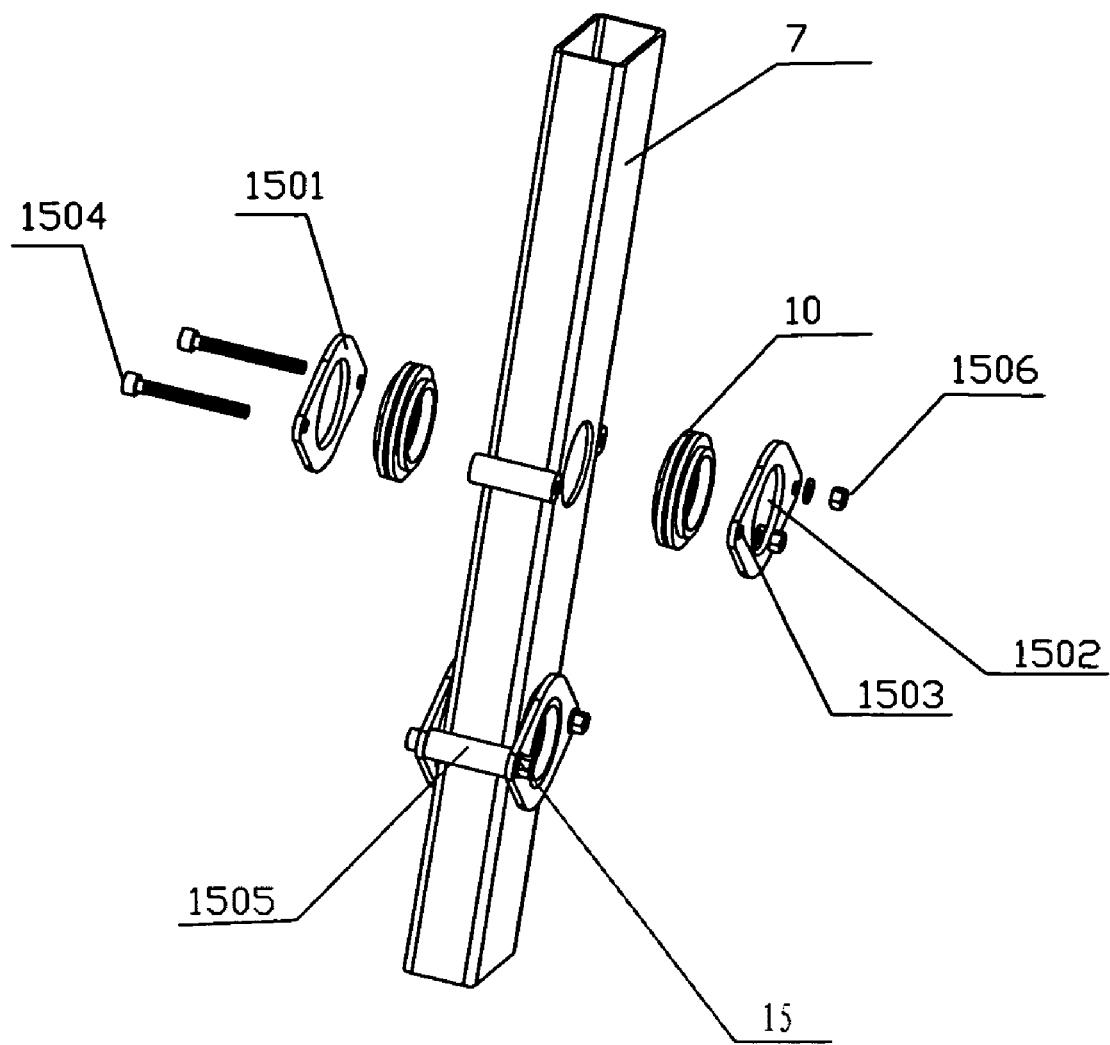
FIG. 3 is a schematic view of sealing structure of the scrubbing collar.

As shown in FIG. 1, the cleaning structure 2 of the live sterilization system according to the present embodiment comprises scrubbing collars 10, cleaning liquid boxes 7, a sliding bar 304, a towing bar 5, and several supporting bars 6 for the cleaning structure.

Each cleaning liquid box 7 as a whole is a pipe with its two ends sealed and in FIG. 1 all the boxes 7 are shown vertically mounted on or fixed to the two ends and middle portion of the supporting bars 6 respectively so as to form together with the supporting bars 6 a rectangular shape. Several sets of holes 13 with the same diameter for scrubbing collars are provided on the opposite sides of each box 7 with each set at the same height. And a cleaning liquid addition port 8 and a cleaning liquid drain port 9 are respectively provided at the top and close to the bottom of each cleaning liquid box 7. Said cleaning liquid addition port 8 is connected with a cleaning liquid supply pipe and the cleaning liquid drain port 9 is closed by a detachable sealing member 11. Each UV lamp is separately installed within a protective sleeve passing through the scrubbing collars 10 for both cleaning the protective sleeve and preventing the cleaning liquid from leaking outside(or, in other words, encapsulating the cleaning liquid).

Each scrubbing collar 10 is sealed by an outside seal-assisting structure 15 comprising at least one press cap 1501 of ring shape as a whole with hole 1502 for protective sleeve and eyelet(s) 1503, and at least one supporting member 1505 is provided outside the cleaning liquid box 7 for preventing the press cap from deforming by force. The press caps 1501 at the opposite sides of the cleaning liquid box 7 are locked together on the supporting member 1505 by screw bolts passing through the eyelets 1503 and the nuts 1506, thus the scrubbing collar 10 is tightly pressed onto the cleaning liquid box 7, and thus the sealing effect between the cleaning liquid box 7 and the scrubbing collar 10 and/or the protective sleeve is improved so as to avoid leakage of the cleaning liquid.

It is also possible to provide female thread in the inner wall of the press cap 1501 and male thread on the cleaning liquid box 7, thus the press cap 1501 is pressed upon the cleaning liquid box 7 firmly by thread-engagement.

The number of the cleaning liquid box 7 in each UV lamp assembly 1 can be determined according to the practical needs, in the UV sterilization system shown in the present embodiment there are three groups of cleaning liquid box 7, respectively on the two ends and middle portion of the supporting bars 6.

One end of the towing bar 5 is connected with and fixed to the outside of the cleaning liquid box 7, and the other end of the towing bar 5 is slidably connected with the sliding bar 304 and fixed to the piston rod 301 of the driving device to move the cleaning structure. The cleaning structure is driven through the towing bar by the driving device to reciprocate along the protective sleeves, thus the scrubbing collars of the cleaning structure are moved to wipe the surface of the lamp protective sleeves back and forth to carry out the cleaning.

The joint of the towing bar 5 and the cleaning liquid box 7 is sealed. The piston barrel 302 of the driving device 3 and the two ends of the sliding bar 304 are fixed to the frame of the UV sterilization lamp assembly 1 by means of fixing means 12 such as screw-bolts and angle iron. One end of the towing bar 5 is extended through by the sliding bar 304 with a sliding ring 4 therebetween made of low sliding resistance material. The other end of the towing bar 5 is connected with the cleaning liquid box 7 through connection means 14, and the joint between the connection means 14 and the cleaning liquid box 7 is sealed by a sealing member. The piston barrel 302 is connected with an air supply pipe 303, and one end of the piston rod 301 of the driving device 3 is fixed-connected with the towing bar 5. During cleaning operation air is supplied from an air compressor of the driving device 3, and the piston rod is urged to perform reciprocating movement so as to scrub the surface of the lamp protective sleeve back and forth.

During the scrubbing the cleaning liquid in the box is adhesive to the lamp protective sleeve for acting on the dirt and removing the same by mechanical movement of the scrubbing collars 10.

Since each scrubbing collar 10 is in the form of flexible ring with double functions of mechanical cleaning and chemical medicament encapsulating, the surface of the lamp protective sleeve can be cleaned both mechanically and chemically without the leakage of chemical medicament. The driving device in the present embodiment is a pneumatic device, but it can also be a hydraulic one.

Online cleaning during sterilization can be realized with the UV sterilization device with autocleaning structure according to the present invention, i.e., the surface of the lamp protective sleeve can be cleaned when the UV sterilization system is in service without influencing the effect. Therefore, the device of this kind can be widely used for the sterilization of fluid such as sewage, tap water, etc.

The invention claimed is:

1. A UV sterilization device with autocleaning structure comprising a UV lamp assembly, at least one cleaning structure and at least one driving device for the cleaning structure, characterized in that each cleaning structure comprises scrubbing collars (10), at least one cleaning liquid box (7), at least one towing bar (5), at least one sliding bar (304) and at least one supporting bar (6), wherein said at least one cleaning liquid box (7) as a whole is a pipe with its two ends sealed, and several sets of holes (13) with the same diameter, in which the scrubbing collars (10) are inlaid, are provided on the opposite sides of said at least one cleaning box (7) with each set at the same height, each UV lamp is separately installed within a protective sleeve, and all the protective sleeves to be cleaned pass through the holes (13) in said at least one cleaning liquid box (7), said at least one cleaning liquid box (7) is vertically fixed to said at least one supporting bar (6) and forms a rectangular frame together with said at least one supporting bar (6); one end of said at least one towing bar (5) is connected with and fixed to the outside of one of at least one cleaning liquid box (7), and the other end thereof is slidably connected with at least one sliding bar(304); said at least one towing bar (5) is fixed-connected with a piston rod (301) of the driving device (3) to move the cleaning structure (2); the piston rod (301) drives said at least one towing bar (5) to reciprocate in the axial direction of the lamp protective sleeve; a cleaning liquid addition port (8) and a cleaning liquid drain port (9) are respectively provided at the top and close to the bottom of said at least one cleaning liquid box (7), wherein the cleaning liquid addition port (8) is connectable to a cleaning liquid supply pipe and the cleaning liquid drain port (9) is sealed by a detachable sealing member (11).

2. A UV sterilization device with autocleaning structure according to claim 1, characterized in that each scrubbing collar (10) is tightly pressed and sealed by an outside seal-assisting structure (15).

3. A UV sterilization device with autocleaning structure according to claim 1, characterized in that sealing means are arranged between said scrubbing collars (10) and the corresponding holes (13).

4. A UV sterilization device with autocleaning structure according to claim 1, characterized in that said each scrubbing collar (10) is in the form of flexible ring with double functions of mechanical cleaning and chemical medicament encapsulating.

5. A UV sterilization device with autocleaning structure according to claim 1, characterized in that said driving device is a pneumatic one.

6. A UV sterilization device with autocleaning structure according to claim 1, characterized in that said driving device is a hydraulic one.

* * * * *